United States Patent
Maniktala

(10) Patent No.: US 11,005,304 B2
(45) Date of Patent: May 11, 2021

(54) FOREIGN OBJECT AND VALID RECEIVER DETECTION TECHNIQUES IN WIRELESS POWER TRANSFER

(71) Applicant: ChargEdge, Inc., Fremont, CA (US)

(72) Inventor: Sanjaya Maniktala, Fremont, CA (US)

(73) Assignee: CHARGEDGE, INC., Fremont, CA (US)

( * ) Notice: Subject to any disclaimer, the term of this patent is extended or adjusted under 35 U.S.C. 154(b) by 0 days.

(21) Appl. No.: 16/450,955

(22) Filed: Jun. 24, 2019

(65) Prior Publication Data

US 2019/0393731 A1 Dec. 26, 2019

Related U.S. Application Data

(60) Provisional application No. 62/689,204, filed on Jun. 24, 2018.

(51) Int. Cl.
| | |
|---|---|
| *B60L 1/00* | (2006.01) |
| *B60L 3/00* | (2019.01) |
| *H02J 7/00* | (2006.01) |
| *H02J 50/40* | (2016.01) |
| *H02J 50/80* | (2016.01) |
| *H02J 50/60* | (2016.01) |
| *H02J 50/12* | (2016.01) |
| *H02J 50/20* | (2016.01) |

(52) U.S. Cl.
CPC ............. *H02J 50/60* (2016.02); *H02J 50/12* (2016.02); *H02J 50/20* (2016.02)

(58) Field of Classification Search
None
See application file for complete search history.

(56) References Cited

U.S. PATENT DOCUMENTS

| | | | |
|---|---|---|---|
| 9,410,823 B2* | 8/2016 | Widmer | B60L 53/65 |
| 10,170,939 B2* | 1/2019 | Asanuma | H02J 50/90 |
| 10,199,881 B2* | 2/2019 | Muratov | H02J 50/60 |
| (Continued) | | | |

FOREIGN PATENT DOCUMENTS

WO    2018-106072 A1    6/2018

OTHER PUBLICATIONS

International Search Report and Written Opinion dated Sep. 2, 2019 in corresponding PCT/US2019/038785.

*Primary Examiner* — Kenneth B Wells
(74) *Attorney, Agent, or Firm* — White & Case LLP

(57) ABSTRACT

Systems and methods are presented for detecting a foreign object on a wireless power transmitter, the transmitter configured to wirelessly charge power to a device when the device is on or in close proximity to a charging surface of the transmitter. The system includes a wireless power transmitter and a controller coupled to the wireless power transmitter. The controller is configured to detect a first resonant frequency of the wireless power transmitter when an object is not present on or is not in close proximity to the charging surface of the wireless power transmitter, detect a second resonant frequency of the wireless power transmitter in response to applying a power to the wireless power transmitter, compare the first resonant frequency and the second resonant frequency, and based on the comparison, determine whether an object is on or is in close proximity to the charging surface of the wireless power transmitter.

16 Claims, 8 Drawing Sheets

(56) References Cited

U.S. PATENT DOCUMENTS

| | | |
|---|---|---|
| 10,277,062 B2 * | 4/2019 | Govindaraj ........... B60L 53/122 |
| 10,581,281 B2 * | 3/2020 | Muratov ................. H02J 50/12 |
| 2016/0226311 A1 | 8/2016 | Kanno |
| 2017/0117756 A1 | 4/2017 | Muratov |

* cited by examiner

FOREIGN OBJECT AND VALID RECEIVER DETECTION TECHNIQUES IN WIRELESS POWER TRANSFER

CROSS-REFERENCE TO RELATED APPLICATION

This application claims the benefit of U.S. Provisional Patent Application No. 62/689,204, entitled "Foreign Object And Valid Receiver Detection Techniques in Wireless Power Transfer," filed on Jun. 24, 2018 the subject matter of which is hereby incorporated by reference in its entirety.

FIELD OF THE INVENTION

The present invention generally relates to systems and methods for detecting a foreign object on a wireless power transmitter.

BACKGROUND

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. The limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone or tablet.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Typical wireless power transfer transmitters have a flat or concave surface on which devices to be charged are placed. Objects other than devices that can be wirelessly charged are sometimes placed on the charging surface of a wireless power transmitter, whether intentionally or inadvertently. Certain metal objects such as coins, paper clips, and some jewelry can develop eddy currents in response to the varying magnetic field produced by the wireless power transmitter. Such "foreign objects" cause losses in the power being transferred to a wirelessly-chargeable device. Also, if left on the surface of the transmitter for a period of time, the eddy currents can cause the foreign metal object to overheat, potentially causing burns or igniting a fire.

The foreign object detection technique set forth in the Qi standard compares the amount of power transmitted by the transmitter and the amount of power that the wireless power receiver reports back to the transmitter. The difference between the two values is a loss number. Eddy currents that develop in a foreign object, such as a coin, on the transmitter surface will cause the loss number to increase. If the loss number exceeds a predetermined threshold, an indicator such as a light emitting diode may be triggered while the transmitter continues to transmit power. If the loss number exceeds the predetermined threshold for a predetermined amount of time, for example ten seconds, the transmitter will stop transmitting power. This technique shuts off the power from the transmitter before significant heat can build up in the foreign object. But a user may not realize that the transmitter has stopped transmitting power and assume that device charging is still in progress. So while the Qi foreign object detection technique improves the safety of the wireless power transmitter, it has the drawback of shutting off charging without the user realizing that charging has stopped.

Another drawback of existing methods of foreign object detection relates to inaccuracy in determining the actual amount of power transmitted or received. For example, a Qi-compliant transmitter indirectly estimates the AC power transmitted by the coil by sensing the DC voltage and current input to the transmitter, which can cause over 300 mW of error at 5 W. In other words, based on the input DC values, when a Qi transmitter determines that it is transmitting 5 W, the actual power may be a value between 4.7 W to 5.3 W. Similarly, a Qi-compliant receiver also indirectly estimates the AC power reaching its coil by sensing the output DC voltage and current, which can cause an error of 300 mW at 5 W. These errors at the transmitter and receiver can compound such that a foreign object escapes detection. For example, a Qi transmitter may be transmitting 5.3 W of power and the Qi receiver may be receiving 4.7 W of power, so the actual power loss is 600 mW, which can be caused by a coin or other foreign object on the transmitter absorbing the 600 mW. But because of errors both the transmitter and receiver sense that the power being transferred is 5 W, so the loss number is determined to be zero and the transmitter keeps operating. Absorbing 600 mW of power can raise the temperature of a coin to a potentially unsafe level. This problem becomes even more dangerous for systems operating at higher power levels such as 10 W. Assuming the same percentage of error, the transmitter and receiver would each have a sensing error of 0.6 W, which could lead to a total power loss of 1.2 W going undetected. A coin on the transmitter absorbing 1.2 W of power going undetected can rise to a temperature that is a definite fire hazard. This inaccuracy in sensing transferred power is a major drawback that prevents Qi-compliant systems from safely delivering more than 5 W.

Further, Qi and other methods are attempting to do foreign object detection in different ways. At power levels below 5 W, the Qi standard asks the receiver to essentially tell the transmitter how much power it received, and the transmitter then compares it with the power it sent out, and if there is a significant difference between the transmitted power and received power, that is supposedly lost in an intervening metal object. However this method looks sound on paper only. In reality, the receiver has no idea of the actual power received at its coil, and in effect tries to do a backward calculation based on the DC output voltage and DC output current as measured by it. Similarly the transmitter does not accurately know the power sent out at its coil, but bases its estimate of transmitted power on a rather error-prone extrapolation starting with the DC input voltage and current measured by it. Eventually, even by the 5 W output power level, the inherent errors in this method cumulate, making this method practically useless. The Qi standard was thus updated for higher powers and used a "Q-factor" method for example to achieve 15 W, which in effect simply excites or pings the transmitter coil or even adjacent sense coils, with a certain frequency, and then basically measures how the excitation decays over a period of time, indicating either an open surface in which the excitation remains above a certain level after a certain time, or falls below that threshold indicating the presence of something pulling energy out from the transmitter coil. However this method is very tricky, as it is very hard to decipher whether the drop in excitation was due to a metal object or a genuine receiver. So this method has also become very error-prone and has led to a reported steep fall in interoperability of the Qi standard. In other words, sometimes the transmitter may simply mistake a genuine receiver for a coin and not even turn on. Or it may allow a metal object, thinking it is a receiver.

Thus, there is a long felt need for an improved technique for dealing with foreign objects in wireless power transfer systems.

BRIEF DESCRIPTION

The systems and methods described herein use a wireless power transmitter to provide wireless power. In an aspect, a method is presented for detecting a foreign object on a wireless power transmitter, the wireless power transmitter configured to wirelessly charge power to a device when the device is on or in close proximity to a charging surface of the wireless power transmitter. For example, the wireless power transmitter detects when a foreign object is on top of or in close proximity to a wireless power transmitter. For example, a foreign object is in close proximity to the wireless power transmitter when it adds a resistive load to the wireless power transmitter. The foreign object can be any object that includes a metal, such as an alloy, aluminum, brass, bronze, chrome, copper, foil, gold, iron, lead, magnesium, mercury, nickel, pewter, platinum, silver, steel, solder, tin, titanium, or zinc metal.

The method includes detecting a first resonant frequency of the wireless power transmitter when an object is not present on or is not in close proximity to the charging surface of the wireless power transmitter and detecting a second resonant frequency of the wireless power transmitter in response to applying a power to the wireless power transmitter. A controller coupled to the wireless power transmitter detects a first resonant frequency of the wireless power transmitter when an object is not present on or is not in close proximity to the charging surface of the wireless power transmitter by performing one or more frequency sweeps at a fixed power strength (e.g., using phase modulation, duty cycle modulation, or a fixed input voltage). In some implementations, the power strength is increased (or decreased) in fixed steps for each subsequent frequency sweep. The fre-
quency sweep may sweep from a high frequency to a low frequency to detect the frequency at which a rectified peak voltage is maximized. The rectified peak voltage is maximized at the resonant frequency. For example, the frequency sweep may sweep from 300 kHz to 75 kHz. As another example, the frequency sweep may sweep from 300 kHz to 25 kHz. The frequency sweep may also sweep from a low frequency to a high frequency (e.g., from 25 kHz to 300 kHz or from 75 kHz to 300 kHz). The power strength of the one or more frequency sweeps performed when detecting the first resonant frequency may be set so that at least one frequency sweep has a resonant rectified peak voltage that is higher than a threshold peak voltage.

In some implementations, the first resonant frequency is determined to be the resonant frequency when one or more frequency sweeps of fixed, increasing power strengths are performed such that each frequency sweep has substantially the same resonant frequency and at least one of the frequency sweeps has a rectified resonant peak voltage that is higher than a threshold voltage. For example, the resonant frequency may be between 140 kHz and 150 kHz. As another example, the resonant frequency may be between 60 kHz and 90 kHz.

The controller coupled to the wireless power transmitter detects a second resonant frequency of the wireless power transmitter in response to applying a power to the wireless power transmitter. The wireless power transmitter detects a second resonant frequency of the wireless power transmitter by performing one or more frequency sweeps at a fixed power strength (e.g., using phase modulation, duty cycle modulation, or a fixed input voltage). The power strength corresponds to an amount of power applied to the wireless power transmitter via phase modulation, duty cycle modulation, or a fixed input voltage. The power strength increases as the applied power increases, and decreases as the applied power decreases. In some implementations, the power strength is increased (or decreased) in fixed steps for each subsequent frequency sweep. For example, when applying power via phase modulation, the power strength may be increased as the phase is increased (e.g., from 5% phase to 7% phase to 9% phase). The frequency sweep may sweep from a high frequency to a low frequency to detect the frequency at which a rectified peak voltage is maximized. The rectified peak voltage is maximized at the resonant frequency. For example, the frequency sweep may sweep from 300 kHz to 75 kHz. As another example, the frequency sweep may sweep from 300 kHz to 25 kHz. The frequency sweep may also sweep from a low frequency to a high frequency (e.g., from 25 kHz to 300 kHz or from 75 kHz to 300 kHz).

For example, a controller may be configured to apply a power (e.g., via phase modulation at a phase of 5%) to the wireless power transmitter to detect a second resonant frequency.

The method further includes comparing the first resonant frequency and the second resonant frequency and based on the comparison, determining whether an object is on or is in close proximity to the charging surface of the wireless power transmitter. A controller compares the first resonant frequency and the second resonant frequency to determine whether an object is on or is in close proximity to the charging surface of the wireless power transmitter. For example, the controller determines that an object (e.g., either a receiver that include a magnetic material or a foreign object that includes a metal) is present on or in close proximity to the charging surface of the wireless power transmitter if the second resonant frequency is either (i)

higher or (ii) lower than the first resonant frequency. The controller determines that an object is not present on or in close proximity to the charging surface of the wireless power transmitter if the second resonant frequency is substantially the same as the first resonant frequency. For example, the second resonant frequency may be substantially the same as the first resonant frequency if they are within less than 1% of each other.

In some implementations, the method further includes detecting a third resonant frequency of the wireless power transmitter in response to applying a second power to the wireless power transmitter. For example, a controller may detect a third resonant frequency using a frequency sweep in response to applying a second power to the wireless power transmitter (e.g., via phase modulation with a phase of 7%).

The method further includes comparing the first, second, and third resonant frequencies. For example, a controller may compare the first, second, and third resonant frequencies values.

Based on the comparison, the method further includes determining whether an object is present on the surface of the wireless power transmitter.

In some implementations, the method further includes determining whether the first, second, and third resonant frequencies are substantially a same value. For example, a controller may compare the first second and third resonant frequencies to determine if they are substantially a same value.

In response to determining that the first, second, and third resonant frequencies are not the same value, the method further includes determining that the object is present on or in close proximity of the surface of the wireless power transmitter.

In response to determining that the first, second, and third resonant frequencies are the same value, the method further includes determining that the object is not present on or is not in close proximity to the surface of the wireless power transmitter.

In some implementations, the method further includes determining that the object is not on or is not in close proximity to the charging surface of the wireless power transmitter if the second resonant frequency is substantially the same as the first resonant frequency.

In some implementations, the method further includes determining that the object is on or is in close proximity to the charging surface of the wireless power transmitter if the second resonant frequency is lower than the first resonant frequency.

In some implementations, when determining that an object is present on or in close proximity to the surface of the wireless power transmitter if the second and third resonant frequency values are substantially the same as the first resonant frequency value, the method further includes the object including a magnetic material. For example, the object may be a receiver with that includes ferrite.

In some implementations, the method further includes determining that the object is on or is in close proximity to the charging surface of the wireless power transmitter if the second resonant frequency is higher than the first resonant frequency. For example, a controller may compare the first resonant frequency and the second resonant frequency to determine that the second resonant frequency is higher than the first resonant frequency.

In some implementations, when determining that the object is on or is in close proximity to the charging surface of the wireless power transmitter if the second resonant frequency is higher than the first resonant frequency, the method further includes the object comprises a metal. For example, the object may be a foreign object that includes metal, such as a coin or a key.

In some implementations, when the object comprises a metal, the method further includes outputting a signal that a foreign object is on or is in close proximity to the charging surface of the wireless power transmitter. For example, an audible or haptic signal may be output by the wireless power transmitter when the detected object comprises a metal.

In another aspect, a system is presented for detecting a foreign object on a wireless power transmitter, the wireless power transmitter configured to wirelessly charge power to a device when the device is on or in close proximity to a charging surface of the wireless power transmitter. The system includes a wireless power transmitter and a controller coupled to the wireless power transmitter. The controller is configured to detect a first resonant frequency of the wireless power transmitter when an object is not present on or is not in close proximity to the charging surface of the wireless power transmitter and detects a second resonant frequency of the wireless power transmitter in response to applying a power to the wireless power transmitter.

The controller detects a first resonant frequency of the wireless power transmitter when an object is not present on or is not in close proximity to the charging surface of the wireless power transmitter by performing one or more frequency sweeps at a fixed power strength (e.g., using phase modulation, duty cycle modulation, or a fixed input voltage). In some implementations, the power strength is increased (or decreased) in fixed steps for each subsequent frequency sweep. The frequency sweep may sweep from a high frequency to a low frequency to detect the frequency at which a rectified peak voltage is maximized. The rectified peak voltage is maximized at the resonant frequency. For example, the frequency sweep may sweep from 300 kHz to 75 kHz. As another example, the frequency sweep may sweep from 300 kHz to 25 kHz. The frequency sweep may also sweep from a low frequency to a high frequency (e.g., from 25 kHz to 300 kHz or from 75 kHz to 300 kHz). The power strength of the one or more frequency sweeps performed when detecting the first resonant frequency may be set so that at least one frequency sweep has a resonant rectified peak voltage that is higher than a threshold peak voltage.

In some implementations, the first resonant frequency is determined to be the resonant frequency when one or more frequency sweeps of fixed, increasing power strengths are performed such that each frequency sweep has substantially the same resonant frequency and at least one of the frequency sweeps has a rectified resonant peak voltage that is higher than a threshold voltage. For example, the resonant frequency may be between 140 kHz and 150 kHz. As another example, the resonant frequency may be between 60 kHz and 90 kHz.

The controller detects a second resonant frequency of the wireless power transmitter in response to applying a power to the wireless power transmitter. The wireless power transmitter detects a second resonant frequency of the wireless power transmitter by performing one or more frequency sweeps at a fixed power strength (e.g., using phase modulation, duty cycle modulation, or a fixed input voltage). The power strength corresponds to an amount of power applied to the wireless power transmitter via phase modulation, duty cycle modulation, or a fixed input voltage. The power strength increases as the applied power increases, and decreases as the applied power decreases. In some implementation, the power strength is increased (or decreased) in fixed steps for each subsequent frequency sweep. For example, when applying power via phase modulation, the power strength may be increased as the phase is increased (e.g., from 5% phase to 7% phase to 9% phase). The frequency sweep may sweep from a high frequency to a low frequency to detect the frequency at which a rectified peak voltage is maximized. The rectified peak voltage is maximized at the resonant frequency. For example, the frequency sweep may sweep from 300 kHz to 75 kHz. As another example, the frequency sweep may sweep from 300 kHz to 25 kHz. The frequency sweep may also sweep from a low frequency to a high frequency (e.g., from 25 kHz to 300 kHz or from 75 kHz to 300 kHz).

For example, a controller may be configured to apply a power (e.g., via phase modulation at a phase of 5%) to the wireless power transmitter to detect a second resonant frequency.

The controller is configured to compare the first resonant frequency and the second resonant frequency and based on the comparison, determine whether an object is on or is in close proximity to the charging surface of the wireless power transmitter. The controller compares the first resonant frequency and the second resonant frequency to determine whether an object is on or is in close proximity to the charging surface of the wireless power transmitter. For example, the controller determines that an object (e.g., either a receiver that includes a magnetic material or a foreign object that includes a metal) is present on or in close proximity to the charging surface of the wireless power transmitter if the second resonant frequency is either (i) higher or (ii) lower than the first resonant frequency. The controller determines that an object is not present on or in close proximity to the charging surface of the wireless power transmitter if the second resonant frequency is substantially the same as the first resonant frequency. For example, the second resonant frequency may be substantially the same as the first resonant frequency if they are within less than 1% of each other.

In some implementations, the controller is further configured to detect a third resonant frequency of the wireless power transmitter in response to applying a second power to the wireless power transmitter. For example, a controller may detect a third resonant frequency using a frequency sweep in response to applying a second power to the wireless power transmitter (e.g., via phase modulation with a phase of 7%).

The controller is further configured to compare the first, second, and third resonant frequencies. For example, a controller may compare the first, second, and third resonant frequency values.

Based on the comparison, the controller is further configured to determine whether an object is present on or in close proximity to the surface of the wireless power transmitter. For example, the controller is configured to determine whether an object is present on or in close proximity to the surface of the wireless power transmitter based on whether the second and third resonant frequencies are substantially the same as the first resonant frequency.

In some implementations, the controller is further configured to determine whether the first, second, and third resonant frequencies are substantially a same value. For example, a controller may compare the first second and third resonant frequencies to determine if they are substantially a same value.

In response to determining that the first, second, and third resonant frequencies are not the same value, the controller is further configured to determine that the object is present on or in close proximity of the surface of the wireless power transmitter.

In response to determining that the first, second, and third resonant frequencies are the same value, the controller is further configured to determine that the object is not present on the surface of the wireless power transmitter.

In some implementations, the controller is further configured to determine that the object is not on or is not in close proximity to the charging surface of the wireless power transmitter if the second resonant frequency is substantially the same as the first resonant frequency.

In some implementations, the controller is further configured to determine that the object is on or is in close proximity to the charging surface of the wireless power transmitter if the second resonant frequency is lower than the first resonant frequency.

In some implementations, when determining that an object is present on or in close proximity to the surface of the wireless power transmitter if the second and third resonant frequency values are substantially the same as the first resonant frequency value, the object includes a magnetic material. For example, the object may be a receiver with that includes ferrite.

In some implementations, the controller is further configured to determine that the object is on or is in close proximity to the charging surface of the wireless power transmitter if the second resonant frequency is higher than the first resonant frequency. For example, a controller may compare the first resonant frequency and the second resonant frequency to determine that the second resonant frequency is higher than the first resonant frequency.

In some implementations, when determining that the object is on or is in close proximity to the charging surface of the wireless power transmitter if the second resonant frequency is higher than the first resonant frequency, the object comprises a metal. For example, the object may be a foreign object that includes metal, such as a coin or a key.

In some implementations, when the object comprises a metal, the controller is further configured to output a signal indicating that a foreign object is on or is in close proximity to the charging surface of the wireless power transmitter. For example, an audible or haptic signal may be output by the wireless power transmitter when the detected object comprises a metal.

DETAILED DESCRIPTION

Figure 1:
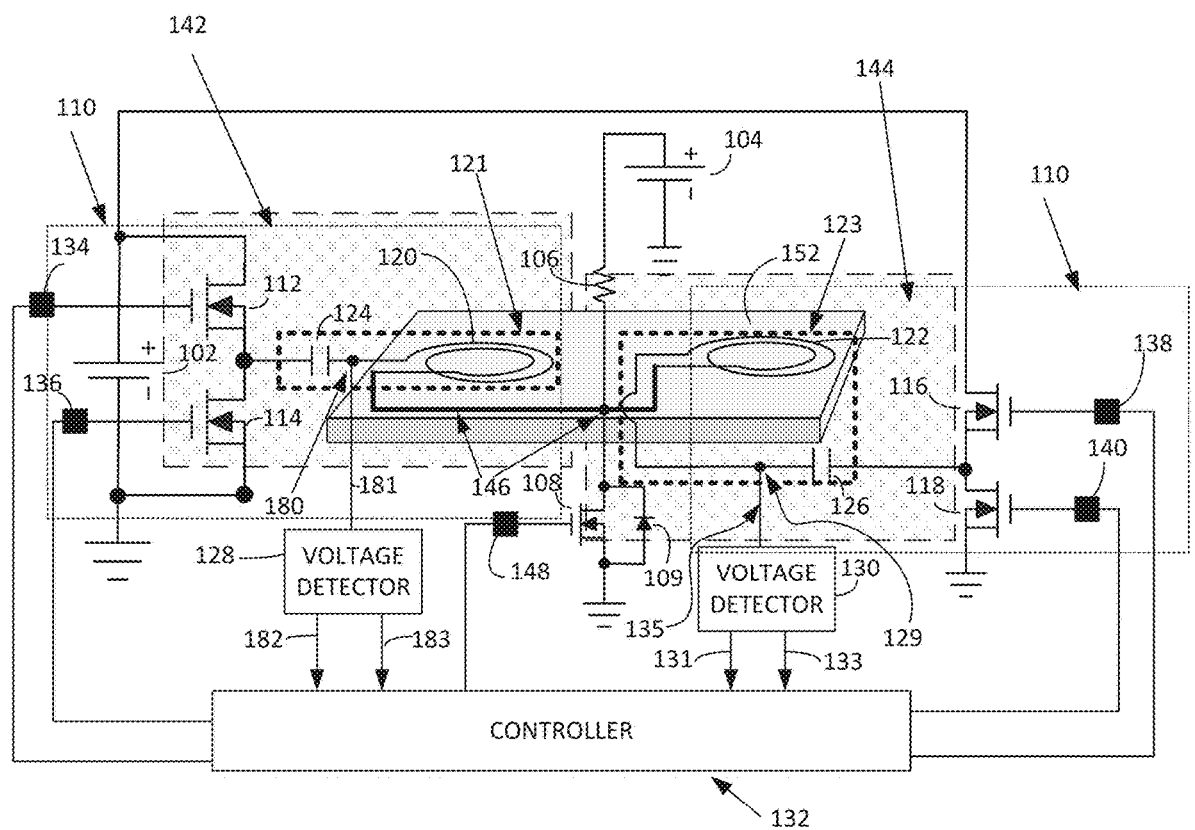
FIG. 1 is a diagram of one embodiment of a wireless power transmitter in a transverse field mode, according to certain implementations.

FIG. 1 is a circuit diagram of one embodiment of a wireless power transmitter in a transverse field mode, according to certain implementations. Transmitter 100 includes, but is not limited to: a direct current (DC) voltage supply 102, controller 132 and a full-bridge rectifier circuit 110, branch 142, and branch 144. Full-bridge rectifier 110 is split into a half-bridge rectifier in branch 142 that includes transistor 112 and transistor 114, and a half-bridge rectifier in branch 144 that includes transistor 116 and transistor 118. Transistor 112 (e.g., a high-side transistor) may be coupled in series with transistor 114 (e.g., a low-side transistor). Transistor 116 (e.g., a high-side transistor) may be coupled in series with transistor 118 (e.g., a high-side transistor). Transistor 112 may be coupled in series with transistor 116, and transistors 114 and 118 may be coupled to ground. Full-bridge rectifier circuit 110 further includes LC tank 121 comprising capacitor 124 coupled in series with transmitter coil 120 (e.g., in branch 142) LC tank 123 comprising capacitor 126 coupled in series with transmitter coil 122 (e.g., in branch 144), and link 146 coupling LC tank 121 with LC tank 123. The gates of transistors 112, 114, 116, and 118 are coupled to controller 132 via driver circuitry 134, 136, 138, and 140, respectively.

Transmitter 100 further includes resistor 106 and DC voltage supply 104 to bias link 146, and a switch coupled to link 146, shown in FIG. 1 as transistor 108 coupled in series with diode 109. Controller 132 drives transistor 108 via driver circuitry 148. Voltage detector 128 takes a voltage measurement from branch 142 at node 180 (e.g., corresponding to the resonant voltage of LC tank 121), and voltage detector 130 takes a voltage measurement from branch 144 at node 129 (e.g., corresponding to the resonant voltage of LC tank 123). Voltage detector 128 and voltage detector 130 may send the resulting voltage measurements to controller 132 via paths 182, 183, 131, and 133.

Transmitter 100 comprises two branches, branch 142 (e.g., the first branch) and branch 144 (e.g., the second branch). Branch 142 comprises transistor 112, transistor 114, and transmitter coil 120 and capacitor 124 (e.g., LC tank 121). Branch 144 comprises transistor 116, transistor 118, and transmitter coil 122 and capacitor 126 (e.g., LC tank 123). In some embodiments, transistors 112 and 114, and transistors 116 and 118, are in a half-bridge configuration.

Controller 132 may independently control and operate each half-bridge rectifier in branch 142 and branch 144, thus independently controlling branch 142 and branch 144. For example, in some configurations, branch 142 may transmit power while branch 144 is "off" (e.g., doesn't transmit power). In other configurations, branch 144 may transmit power while branch 142 is "off" (e.g., doesn't transmit power).

In some embodiments, transmitter coils 120 and 122 are nominally identical coils and capacitors 124 and 126 are nominally identical resonant capacitors. Therefore, the resonant frequencies of branch 142 and branch 144 are the same when transmitter coils 120 and 122 and capacitors 124 and 16 are nominally identical, respectively. The resonant frequency of transmitter 100 (e.g., the overall system) is equal to the resonant frequency of branch 142 (e.g., or branch 144, as they are nominally the same), as disclosed in U.S. Patent Publication No. 20160285319, entitled "Tuned Resonant Microcell-Based Array for Wireless Power Transfer," filed on Mar. 28, 2016, the subject matter of which is hereby incorporated by reference in its entirety. As long as each LC tank is in series with one another, and each LC tank is tuned to the same resonant frequency, the overall resonant frequency of the system is equivalent to the tuned resonant frequency of an individual LC tank.

In other embodiments, LC tanks 121 and 123 include a plurality of transmitter coils and a plurality of capacitors. In some embodiments, capacitor 124 is comprised of a plurality of capacitors, and in some embodiments, capacitor 126 is comprised of a plurality of capacitors.

Voltage supply 102 provides a DC input voltage for transmitter 100, and in one embodiment is a constant value in the range of 12-15 V. In another embodiment, voltage supply 102 is implemented as a DC-to-DC converter (not shown) that provides a variable DC input voltage to full-bridge 110, and controller 132 provides a control signal to voltage supply 102 to select the input voltage value. In other embodiments, duty cycle control or phase modulation of full-bridge circuit 110 may vary the input voltage value to transmitter coil 120 and capacitor 124 and transmitter coil 122 and capacitor 126. In other embodiments, a combination of a variable input voltage from voltage supply 102, duty cycle variation, and/or other phase modulation may be used to vary the voltage input to transmitter coil 120 and capacitor 124 and transmitter coil 122 and capacitor 126. In some embodiments, voltage supply 102 is implemented as a series-pass regulator.

Controller 132 provides control signals to the full-bridge rectifier 110 via driver circuits 134, 136, 138, and 140 to drive each of transistors 112, 114, 116, and 118 on or off. Controller 132 further provides control signals to driver circuit 148 to drive transistor 108 on or off. Driver circuits are known to persons of ordinary skill and may include but are not limited to constant current drivers, constant resistor drivers, bootstrap circuitry, an amplifier, or any other comparable type of driver circuit.

Each of transistors 108, 112, 114, 116, and 118 is an n-type MOSFET; however any other type of transistor is within the scope of the invention. In some embodiments, transistors 108, 112, 114, 116, and 118 may all be p-type field effect transistors (FETs). In some embodiments, transistors 108, 112, 114, 116, and 118 may be any combination of p-type or n-type FETs. In some embodiments, transistors 108, 112, 114, 116, and 118 may be bipolar junction transistors, heterojunction bipolar transistors, or any comparable transistor.

Controller 132 controls the timing of switching transistors 112, 114, 116, and 118 on and off to provide alternating current to LC tank 121 and LC tank 123, respectively. In one embodiment, controller 132 will turn on (e.g., apply a "high" signal to the gates of) transistor 112 and transistor 118 while turning off (e.g., applying a "low" signal to the gates of) transistor 114 and transistor 116 during a time interval. During the next time interval, controller 132 will turn on transistor 114 and transistor 116 and turn off transistor 112 and transistor 118. Controller 132 may also provide for "dead time" between the time intervals, during which potentially cross-conducting pairs of transistors in full-bridge rectifier 110, for example transistors 112 and 114 and/or transistors 116 and 118, are simultaneously off. In one embodiment, the dead time has a duration in the range of 100 nanoseconds to 1 millisecond. The timing of switching these pairs of transistors in full-bridge rectifier 110 on and off by controller 132 establishes an operating frequency for transmitter 100. In one embodiment, controller 132 provides control signals to full-bridge rectifier 110 such that it operates as two half-bridge rectifiers. In one embodiment, controller 132 is a microcontroller. In one embodiment, controller 132 has the capabilities of an ARM M4 or higher. In some embodiments, controller 132 has the processing capabilities such that the frequency resolution when measuring frequency is within 200-400 Hz.

Branch 142 and branch 144 each have a voltage detector, voltage detector 128 and voltage detector 130, respectively. The voltage detectors detect and rectify the voltage at the resonant voltage nodes in their respective branches. For example, in branch 142, voltage detector 128 detects and rectifies the voltage at resonant voltage node 180. In branch 144, voltage detector 130 detects and rectifies the voltage at resonant voltage node 129. The voltages detected by voltage detector 130 and/or voltage detector 128 are used by controller 132 to determine both the operating frequency of transmitter 100 and the resonant frequency of transmitter 100.

Voltage detector 130 receives as an input a voltage measured between node 129 and ground. Voltage detector 130 detects and rectifies the voltage at node 129 and provides a peak voltage value signal to controller 132 through path 131. The peak voltage value signal tracks the peak amplitude values of the rectified voltage waveform measured at node 129. Voltage detector 130 tracks the peak values of the rectified voltage when transmitter 100 is not under load and also when transmitter 100 is under load from a wireless receiver (not shown). Voltage detector 130 also provides a rectified voltage signal to controller 132 through path 133.

In some embodiments, voltage detector 128 receives as an input a voltage measured between node 180 and ground. Voltage detector 128 detects and rectifies the voltage at node 180 and provides a peak voltage value signal to controller 132 through path 182. The peak voltage value signal tracks the peak amplitude values of the rectified voltage waveform measured at node 180. Voltage detector 128 tracks the peak values of the rectified voltage when transmitter 100 is not under load and also when transmitter 100 is under load from a wireless receiver (not shown). Voltage detector 128 also provides a rectified voltage signal to controller 132 through path 183.

In some embodiments, controller 132 may only receive input from one voltage detector (e.g., either voltage detector 128 or voltage detector 130). Controller 132 may only need to receive input from one voltage detector when branch 142 and branch 144 are run synchronously because branch 142 and branch 144 will be driven at the same operating frequency. Therefore, the difference in output control signals from voltage detector 128 and voltage detector 130 should be nominal (e.g., dependent on the tolerance/actual values of each component in the transmitter). An embodiment of voltage detectors 128 and 130 is discussed further below in conjunction with FIG. 2A.

Controller 132 generates control signals to control full-bridge rectifier 110 and transistor 108. In one embodiment, controller 132 is a microcontroller executing firmware configured to process the peak voltage value signal and the rectified voltage signal from voltage detector 128 and/or voltage detector 130 and to generate the control signals for full-bridge circuit 110. In other embodiments, controller 132 is embodied as a field programmable gate array, a state machine, or an application specific integrated circuit (ASIC) configured to process the signals from voltage detector 128 and/or voltage detector 130 and to generate the control signals.

Controller 132 is configured to detect the varying resonant frequency of transmitter 100. For example, controller 132 is configured to vary the operating frequency of transmitter 100 over a range of frequencies and to process the resulting peak voltage value signal from voltage detector 128 or voltage detector 130 to detect the resonant frequency of transmitter 100. The process of detecting the resonant frequency of transmitter 100 by performing frequency sweeping is described in more detail below and in reference to FIGS. 6-7.

Link 146 connects transmitter coil 120 and transmitter coil 122. In some embodiments, link 146 may be a metal link connecting transmitter coil 120 and 122 in a series configuration. For example, conductor 146 may be a wire, a tracing on a printed circuit board, or any other compatible conductive connection. In some embodiments, transmitter coil 120 and transmitter coil 122 are spiral coils laid out on a single ferrite sheet 152, where the ferrite sheet is magnetically coupled to transmitter coil 120 and transmitter coil 122, as shown in FIG. 1.

Resistor 106 may be coupled between transmitter coil 120 and transmitter coil 122 at position 146 in transmitter circuit 100. Resistor 106 may be a biasing resistor connected to DC power supply 104, fixing the value of the voltage at link 146 to be a set voltage. In some embodiments, resistor 106 may range between 1 kΩ to 10 kΩ and connect to a positive biasing voltage (e.g, DC power supply 104). In some embodiments, DC power supply 104 provides a constant voltage of approximately 5-15 V. In some embodiments, resistor 106 may range between 1 kΩ to 10 kΩ and connect to the positive rail of voltage supply 102. Resistor 106 biases the value of the voltage at link 146 such that there is not reverse conduction through diode 109. Biasing the voltage at link 146 further prevents unintended electromagnetic interference at link 146.

Transistor 108 is coupled between link 146 and ground. Transistor 108 is coupled to diode 109 in a parallel configuration. In some embodiments, diode 109 may be an external diode. In some embodiments, diode 109 may be the intrinsic body diode of transistor 108. Controller 132 may turn transistor 108 on or off via driver circuitry 148.

Figure 3:
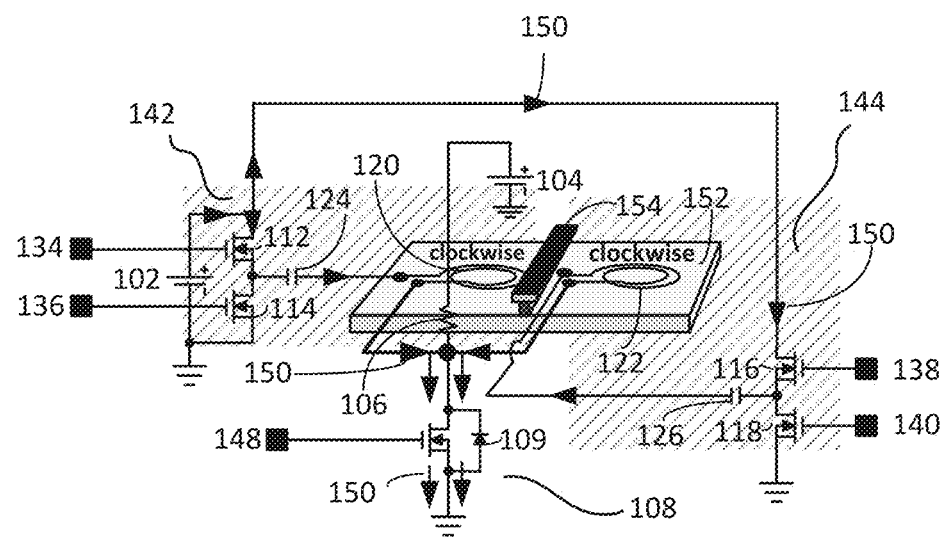
FIG. 3 is a diagram of the wireless power transmitter operating in a synchronous configuration, according to certain implementations.

In some embodiments, transmitter coil 120 and transmitter coil 122 are connected, such that the when transistor 108 is conducting (e.g., the gate of the transistor is held high and transistor 108 is "on"), the polarity of the current through transmitter coil 120 and transmitter coil 122 is the same, as shown and described in reference to FIG. 3. When the gate of transistor 108 is held low (e.g., transistor 108 is "off"), transistor 108 does not conduct in either direction, due to the voltage bias at link 146 from biasing resistor 106. The voltage bias at link 146 reverse biases diode 109, therefore preventing transistor 108 from conducting current in either direction. Therefore, when transistor 108 is off (e.g., the gate of the transistor is held low), the polarity of the current through transmitter coil 120 is different than the polarity of the current through transmitter coil 122, as shown and described in reference to FIG. 4. Controller 132 provides control signals to the gate of transistor 108 via driver circuit 148 to drive transistor 108 on/off.

Figure 2A:
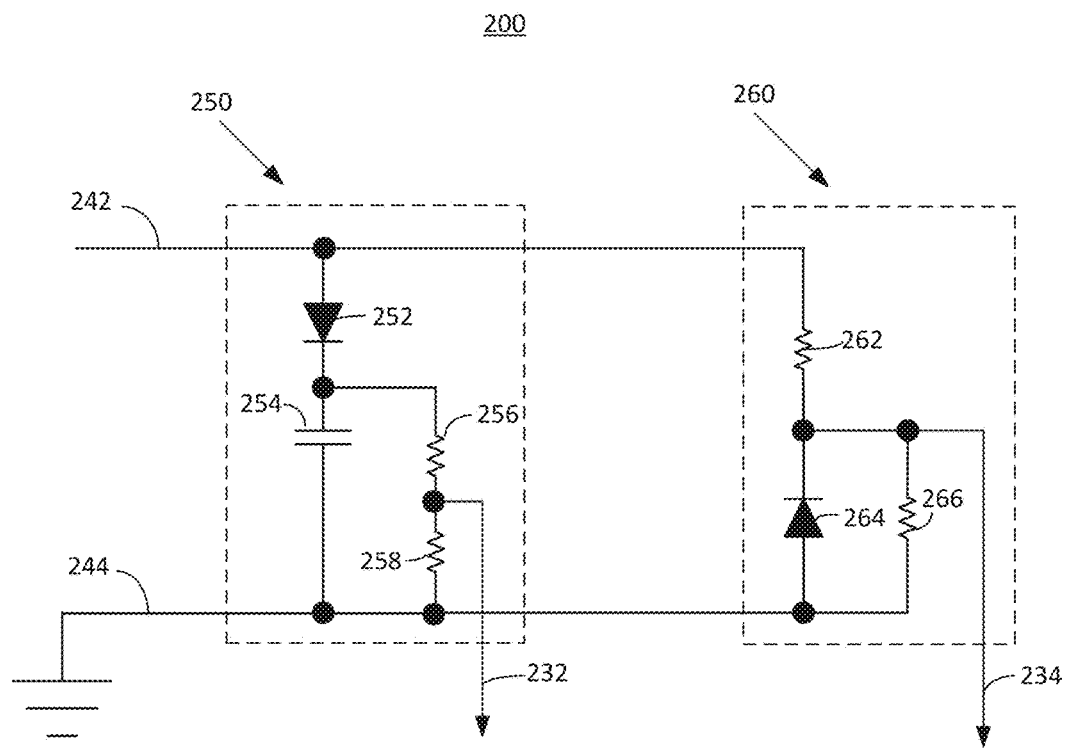
FIG. 2A is a diagram of one embodiment of the voltage detector of FIG. 1, according to certain implementations.

FIG. 2A is a diagram of one embodiment of the voltage detector of FIG. 1, according to certain implementations. Voltage detector 200 includes but is not limited to a peak voltage detector circuit 250 and a voltage magnitude detector circuit 260. Peak voltage detector circuit 250 includes a diode 252 coupled in series with a capacitor 254, a resistor 256, and a resistor 258. In one embodiment, capacitor 254 has a capacitance value of approximately 1 nF, resistor 256 has a resistance value of approximately 200 kΩ, and resistor 258 has a resistance value of approximately 10 kΩ. Path 232 is coupled to a location between resistor 256 and resistor 258 to provide the peak voltage value signal to controller 132. The resistor divider of resistor 256 and resistor 258 scales down the detected voltage to levels appropriate to be input to controller 132. Voltage magnitude circuit 260 includes a resistor 262, a diode 264, and a resistor 266. In one embodiment, resistor 262 has a resistance value of approximately 200 kΩ and resistor 266 has a resistance value of approximately 10 kQ Path 234 is coupled to voltage magnitude circuit 260 to provide the voltage magnitude signal to controller 132. The resistor divider of resistor 262 and resistor 266 scales down the detected voltage to levels appropriate to be input to controller 132. Voltage detector 128 may be equivalent to voltage detector 200, and voltage detector 130 may also be equivalent to voltage detector 200.

Figure 2B:
FIG. 2B is a diagram of the resulting waveforms from the voltage detector of FIG. 2A, according to certain implementations.

FIG. 2B is a diagram of the resulting waveforms from voltage detector 200. Voltage peak waveform 251 is a rectified and scaled-down representation of the peak voltage waveform at node 242 (e.g., either node 129 or node 180). Voltage magnitude waveform 261 is a rectified and scaled-down representation of the voltage waveform at node 242 (e.g., either node 129 or node 180). Voltage magnitude waveform 261 has a zero crossing at 263.

FIG. 3 is a diagram of the transmitter operating in a synchronous configuration, according to an embodiment of the invention. When transistor 108 is "on" (e.g., conducting), branch 142 and branch 144 may be operated synchronously. When transistor 108 is "on," full-bridge 110 is effectively split into two half-bridge rectifiers, with a first half-bridge rectifier corresponding to transistors 112 and 114 in branch 142, and the second half-bridge rectifier corresponding to transistors 116 and 118 in branch 144. Therefore, transmitter 100 may power up to two receivers, one on each branch of transmitter 100.

To power two receivers, one receiver on branch 142 and one receiver on branch 144, controller 132 drives the two half-bridge rectifiers in a specific manner. In some embodiments, controller 132 controls the timing of switching transistors 112, 114, 116, and 118 on and off to provide an alternating current to transmitter coils 120 and 122 and capacitors 124 and 126. In one embodiment, controller 132 will turn on (e.g., apply a "high" signal to the gates of) transistor 112 and transistor 114 while turning off (e.g., applying a "low" signal to the gates of) transistor 116 and transistor 118 during a time interval. During a next time interval, controller 132 will turn on transistor 116 and transistor 118 and turn off transistor 112 and 114 (e.g., driving the two half-bridges in unison). Driving the transistors of the two half-bridge rectifiers in unison induces the current in transmitter coil 120 and transmitter coil 122 to be in a same direction (e.g., the same polarity). For example, as shown in FIG. 3, the current direction in transmitter coil 120 and the current direction in transmitter coil 122 is clockwise. The exemplary direction of the current in FIG. 3 is shown by reference 150.

In one embodiment, in a synchronous configuration when two receivers are present, controller 132 uses a fixed frequency mode to control the switching of the two half-bridge rectifiers. In order to synchronously operate the two branches of transmitter 100 (e.g., branch 142 and branch 144), controller 132 may drive both half-bridge rectifiers at the same operating frequency.

In one embodiment, controller 132 is configured to operate transmitter 100 at a fixed frequency. Controller 132 may process the resulting peak voltage signal from voltage detector 128 (e.g., or voltage detector 130) to detect the operating frequency of transmitter 100. Controller 132 may modify the duty cycle of each of the two half-bridge rectifiers to maintain a fixed operating frequency of transmitter 100. Controller 132 may monitor the operating frequency from the voltage signal from voltage detector 128 (e.g., or voltage detector 130) to identify changes to the operating frequency, and adjust the duty cycle of at least one of the two half-bridge rectifiers to maintain the operating frequency at the fixed value.

Controller 132 may determine the resonant frequency of transmitter 100 operating in a synchronous configuration using the methods and systems described below with reference to FIGS. 6-11.

Figure 4:
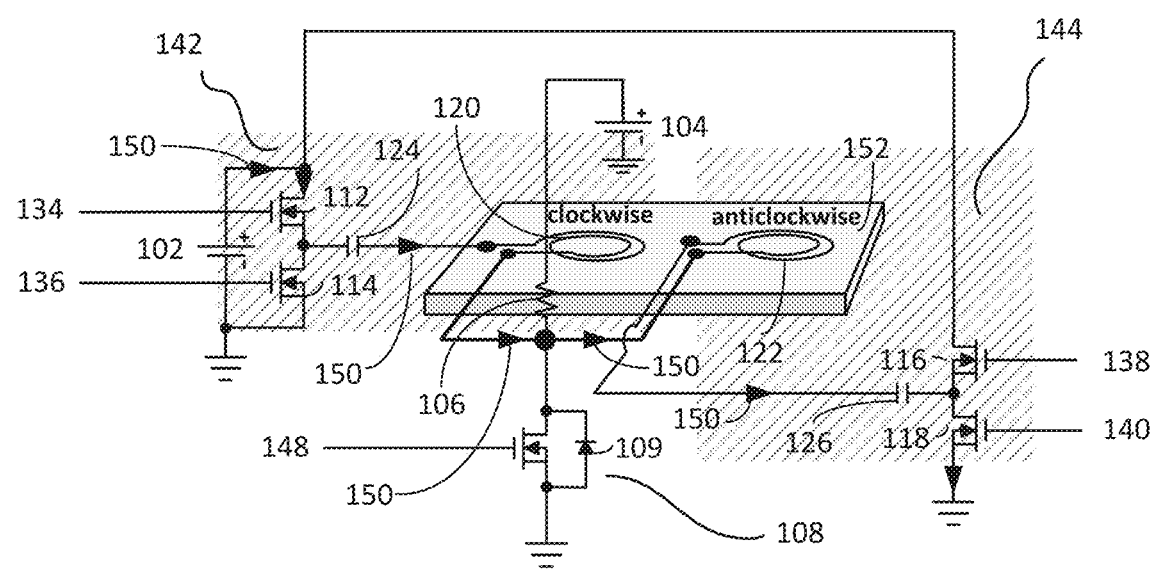
FIG. 4 is a diagram of one embodiment of the wireless power transmitter operating in an opposite polarity configuration, according to certain implementations.

FIG. 4 is a circuit diagram of one embodiment of the wireless power transmitter operating in an opposite polarity configuration with transistor 108 "off," according to some embodiments of the invention. When transistor 108 is "off," branch 142 and branch 144 may be operated in an opposite polarity coil structure. For example, when transistor 108 is "off," the current through transmitter coil 120 may flow in a first direction (e.g., in a clockwise direction), while at the same time, the current through transmitter coil 122 may flow in a second direction (e.g., in a counterclockwise direction). When transistor 108 is "off," controller 132 may drive full-bridge rectifier 110 via drive circuits 134, 136, 138, and 140. In some embodiments, controller 132 may control full-bridge rectifier 110 with phase modulation, as described in detail below. Controller 132 may determine the resonant frequency of transmitter 100 operating in an opposite polarity configuration using the methods and systems described below with reference to FIGS. 6-7.

Figure 5:
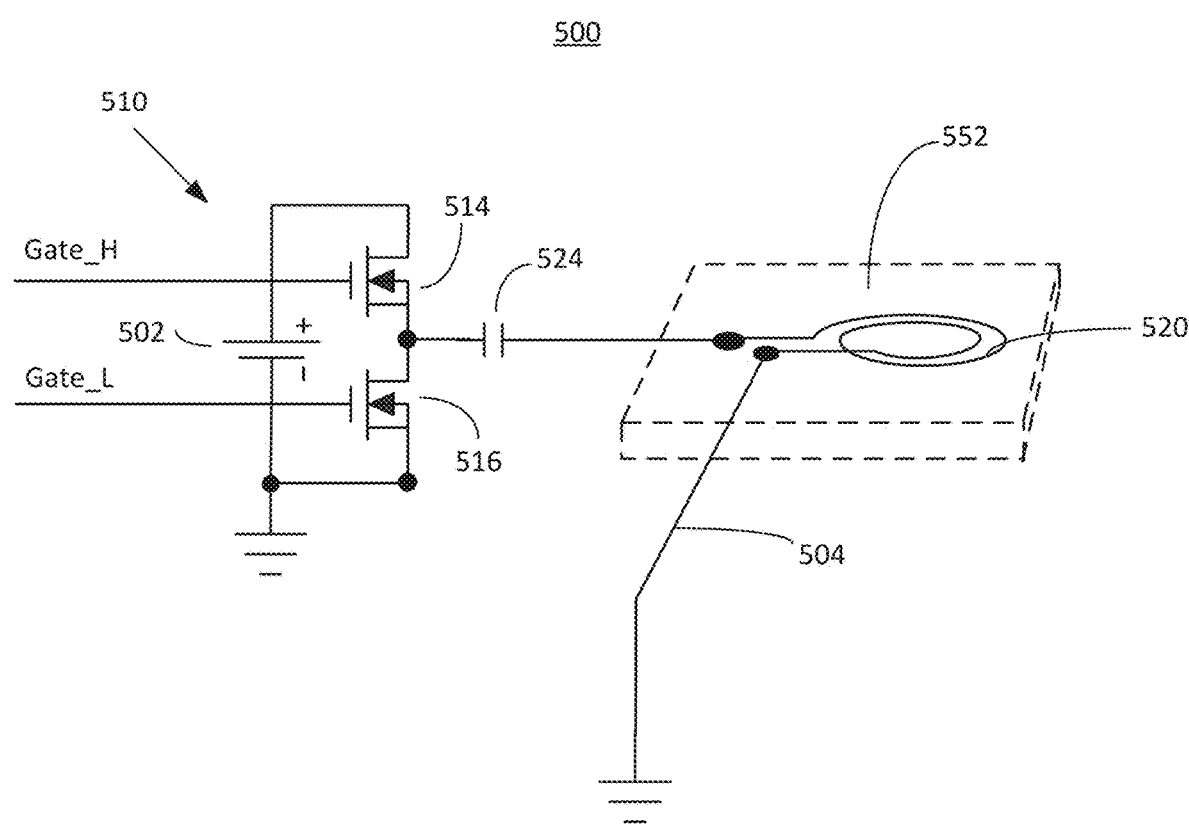
FIG. 5 is a diagram of one embodiment of the wireless power transmitter operating when a single receiver is present, according to certain implementations.

FIG. 5 is a diagram of the transmitter operating when a single receiver is present, according to an embodiment of the invention. When transistor 108 is "on" (e.g., conducting), and controller 132 detects that only one receiver is present, controller 132 may operate only the branch of transmitter 100 that corresponds to the single receiver. FIG. 5 shows a single branch of transmitter 100 that operates when only one receiver is present. Transmitter branch 500 comprises voltage supply 502, half-bridge rectifier 510 that includes transistor 514 and transistor 516, capacitor 524, transmitter coil 520, ferrite sheet 552, and path 504, controller 132 (not shown), and a voltage detector (not shown). In some embodiments, transmitter branch 500 may be branch 142 or branch 144.

In some embodiments, when only one receiver is present, controller 132 "turns off" the inactive branch of transmitter 100 that does not have a receiver coupled to it. For example, to "turn off" a branch, controller 132 may leave the lower transistor (e.g., either transistor 114 or transistor 118) of the inactive branch (e.g., either branch 142 or branch 144) "on" for a majority of the time, with the lower transistor being turned off only for dead time constraints and any need to switch the upper transistor (e.g., either transistor 112 or transistor 116) "on" in order to keep the driver circuitry (e.g., driver circuit 134 and driver circuit 138) functional.

In some embodiments, transmitter 500 may be operated at a fixed frequency, as described above, using duty-cycle control or input-voltage control (e.g., through the use of a DC-DC converter). Controller 132 may determine the resonant frequency of transmitter 100 operating when a single receiver is present using the methods and systems described below with reference to FIGS. 6-11.

The methods and systems for detecting the resonant frequency via one or more frequency sweeps, and determining whether an object (e.g., either a receiver or a foreign object) is on or in close proximity to a charging surface of a wireless power transmitter, as described below in reference to FIGS. 6-11, may be implemented on any of the single (e.g., as shown in FIG. 5) or dual coil topographies (e.g., as shown in FIGS. 1 and 3-4) of transmitter 100 described above with reference to FIGS. 1-5. Furthermore, the methods and systems described below in reference to FIGS. 6-11 are not limited to being implemented on the transmitter topographies described above. The methods and systems for detecting the resonant frequency via one or more frequency sweeps, and determining whether an object (e.g., either a receiver or a foreign object) is on or in close proximity to a charging surface of a wireless power transmitter may be implemented on any one or more inductor-capacitor ("LC") resonant circuits. The methods and systems described below can also be implemented on wireless power transmitter topologies of three or more LC resonant circuits (e.g., three or more transmitter coils).

Figure 6:
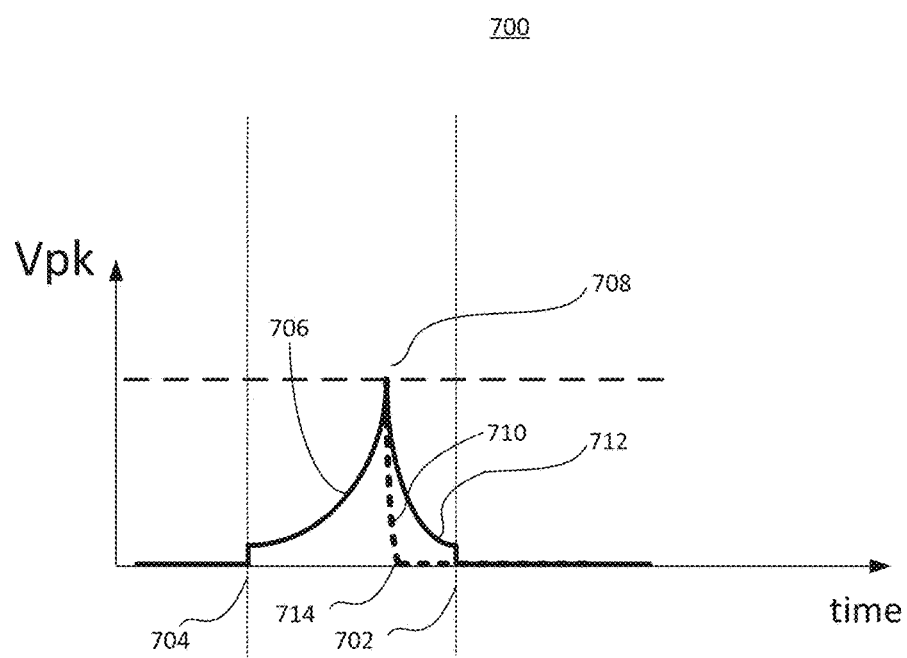
FIG. 6 is an exemplary plot of a frequency sweep to determine the resonant frequency of a wireless power transmitter, according to certain implementations.
Figure 7:
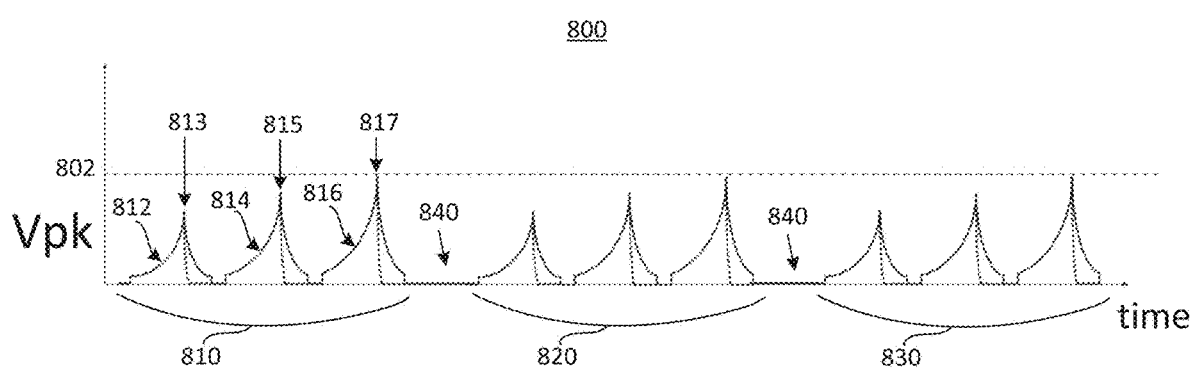
FIG. 7 is an exemplary plot of a plurality of frequency sweeps to determine the resonant frequency of a wireless power transmitter, according to certain implementations.

When detecting the resonant frequency of transmitter 100, controller 132 sweeps a frequency range to detect the resonant frequency. The sweep may either start at a high frequency and sweep towards a low frequency, or start from a low frequency and sweep to a high frequency. As shown in the plot of FIG. 6 and further described below, when the frequency is swept from a high frequency to a low frequency (e.g., 300 kHz to 75 kHz), the peak voltage begins to rise as the frequency is lowered. At a certain frequency, the peak voltage peaks at a maximum voltage. After this frequency, when the frequency is lowered further, the peak voltage drops below the magnitude of the peak voltage at its maximum peak voltage. Therefore the frequency at the peak voltage when at a maximum voltage is recorded by controller 132 as the resonant frequency. The frequency sweep is repeated at least one more time to ensure that the observed resonant frequency is an accurate value and not a product of noise or other anomalies of the circuitry. In some embodiments, the frequency sweep is performed when transmitter 100 is an open circuit.

In some embodiments, after performing a frequency sweep at a first frequency sweep, one or more subsequent frequency sweeps are performed at a higher (or lower) power or powers (e.g., increasing or decreasing the power applied to the LC circuit of transmitter 100). Based on the subsequent detected resonant frequencies, the presence of an object on or in close proximity to the charging surface of transmitter 100 is detectable, as described in reference to FIGS. 7-11 below.

In some embodiments, when transmitter 100 is a single coil transmitter (e.g., the simplest configuration as shown in FIG. 5 with a transmitter coil and a capacitor (LC circuit)), the frequency sweep is performed at a fixed power. For example, the power may be applied to the LC circuit of a single coil transmitter via a fixed input voltage duty cycle modulation (when a half-bridge rectifier circuit is present), or phase modulation (when a full-bridge rectifier circuit is present). The applied power to the LC circuit is then increased (e.g., or decreased) by increasing (or decreasing) the fixed input voltage, increasing (or decreasing) the duty cycle via duty cycle modulation, increasing (or decreasing) the phase via phase modulation, or increasing (or decreasing) a voltage applied to a D class topography that drives the LC circuit.

The power is increased (or decreased) by a small, fixed, amount for each subsequent sweep. The resulting resonant frequencies of each subsequent frequency sweep are compared by controller 132. If the result of the comparison of the two or more resonant frequencies is such that the frequencies are not the same (e.g., within a margin of error), then controller 132 determines that an object (e.g., indicative of a receiver that includes a magnetic material or a foreign object that includes metal) is present on or in close proximity to transmitter 100. In some embodiments, the margin of error is approximately 200 Hz. In some embodiments, the margin of error is a preset value determined by controller 132 (e.g., set based on the frequency resolution of controller 132). And in some embodiments, the margin of error is dynamically determined by controller 132. If the result of the comparison of the two or more resonant frequencies is such that the frequencies are the same (e.g., within a margin of error), then controller 132 determines that the resonant frequency is an open surface resonant frequency (e.g., when a receiver or a foreign object is not present on or in close proximity to a charging surface of transmitter 100).

FIG. 6 is an exemplary plot of a frequency sweep to determine the resonant frequency of the wireless power transmitter. FIG. 6 shows plot 700 of a frequency sweep of transmitter 100 from a starting frequency 702 to an ending frequency 704. The x-axis of plot 700 shows the time (i.e., frequency), and the y-axis of plot 700 shows the peak voltage. In some embodiments, the y-axis of plot 700 shows the rectified peak voltage from voltage detector 200. For example, in some embodiments, the starting frequency 704 may be 300 kHz and the ending frequency 702 may be 75 kHz. Waveform 706 shows that as the frequency decreases, the peak voltage increases until it hits a maximum peak voltage, at 708. The maximum peak voltage at 708 corresponds to the resonant frequency 714, because at resonance, the voltage and current of LC tank 121 and LC tank 123 are at a maximum. For example, in some embodiments, the resonant frequency is between 140 kHz-150 kHz. In some embodiments, the resonant frequency is between 25 kHz and 300 kHz. In some embodiments, after determining the resonant frequency 714 at maximum peak voltage 708, controller 132 may stop the frequency sweep, and the resulting waveform may take the shape of 710. In some embodiments, after determining the resonant frequency 714 at maximum peak voltage 708, controller 132 may continue the frequency sweep until ending frequency 704, and the resulting waveform may take the shape of 712. In some embodiments, the frequency sweep may take approximately 500 ms to complete when sweeping from 300 kHz to 75 kHz. The phase, duty cycle, or input voltage may be fixed and increased (or decreased) in intervals for each successive frequency sweep, as described above.

Figure 8:
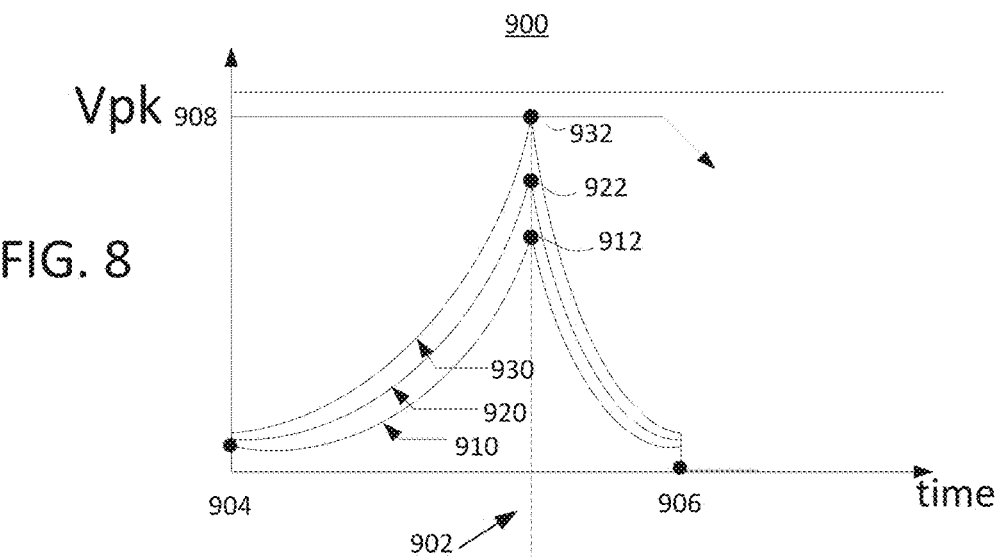
FIG. 8 is an exemplary plot of a plurality of frequency sweeps to determine the open surface resonant frequency of a wireless power transmitter, according to certain implementations.

FIG. 8 is an exemplary plot of a plurality of frequency sweeps to determine the resonant frequency of the wireless power transmitter. In some embodiments, controller 132 may constantly "ping" transmitter 100 to detect the resonant frequency of transmitter 100. For example, each "ping" may comprise a predetermined amount of frequency sweeps (e.g., three frequency sweeps per ping). In some embodiments, there is one frequency sweep per ping. In some embodiments, there are two or more frequency sweeps per ping. For example, FIG. 8 shows plot 800 with pings 810, 820, and 830, where each ping has three frequency sweeps. Each of pings 810, 820, and 830 are separated by an interval of time (e.g., a gap), as shown in FIG. 8 at 840. Interval of time 840 can be any period of time. In some embodiments, interval of time 840 is a few hundred milliseconds. Each of pings 810, 820, and 830 have three frequency sweeps. For example, ping 810 has frequency sweep 812, frequency sweep 814, and frequency sweep 816. Each frequency sweep in a ping may be set at a different input voltage, duty cycle, or phase, depending on the type of power modulation (e.g., input voltage modulation, duty cycle modulation, or phase modulation) implemented. As the input voltage, duty cycle or phase are increased, the resonant peak voltage and current increase. For example, the input voltage, duty cycle or phase in frequency sweeps 812, 814, and 816 in ping 810 may be increased in steps as evidenced by the increased resonant peak voltages 813, 815, and 817. For example, in one embodiment, frequency sweep 812 may have a phase of 5%, frequency sweep 814 may have a phase of 7%, and frequency sweep 816 may have a phase of 9%. In some embodiments, the peak resonant voltage may be higher than a voltage supply rail voltage 802 of controller 132, and therefore may clip at a threshold voltage equivalent to the voltage supply rail voltage 802. In some embodiments, the voltage supply rail voltage 802 is 3.3 V. In some embodiments, the voltage supply rail may be anywhere between 3 V and 15 V.

Figure 9:
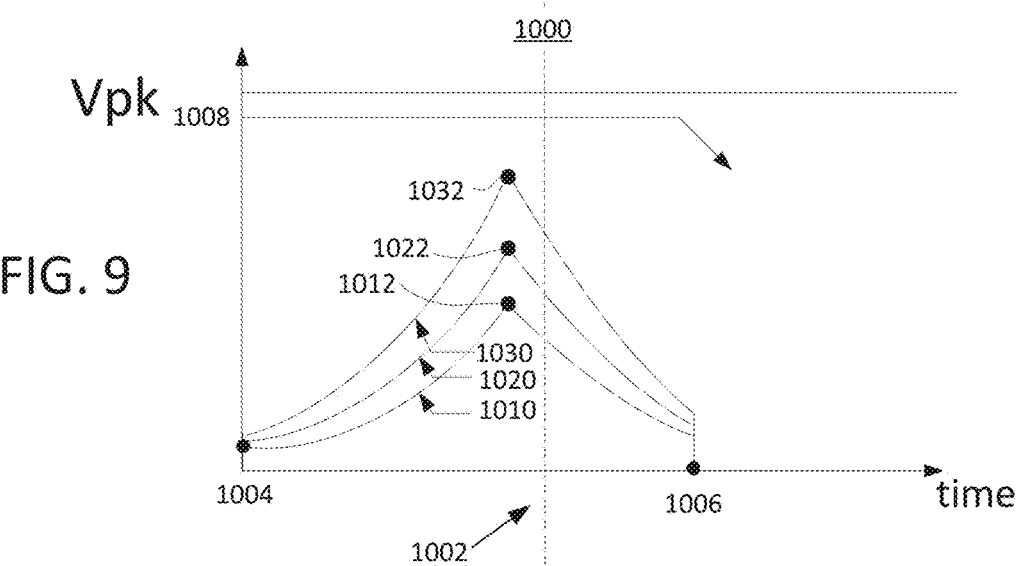
FIG. 9 is an exemplary plot of a plurality of frequency sweeps indicative of foreign object present on the surface of a wireless power transmitter, according to certain implementations.
Figure 10:
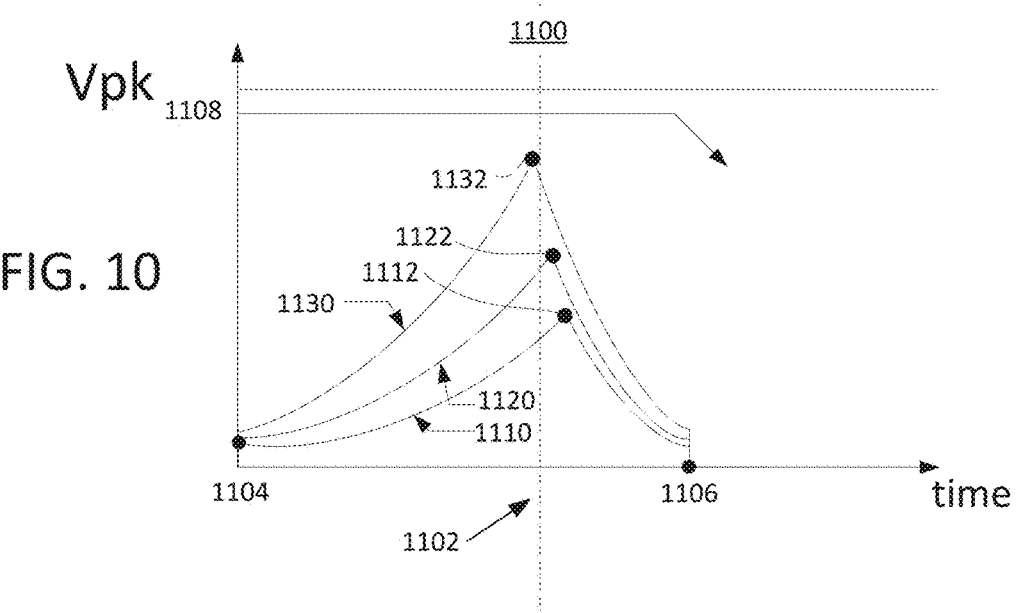
FIG. 10 is an exemplary plot of a plurality of frequency sweeps indicative of receiver present on the surface of a wireless power transmitter, according to certain implementations.
Figure 11:
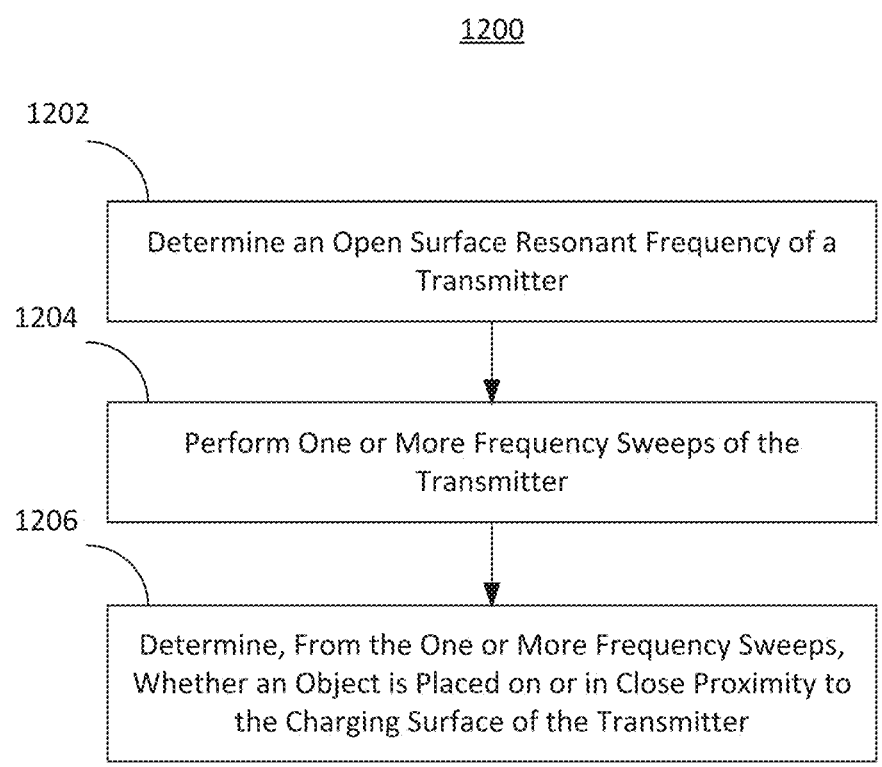
FIG. 11 is a flow chart of a process for detecting an object on or in close proximity to a charging surface of a wireless power transmitter, according to certain implementations.

FIGS. 9-11 are exemplary plots of a plurality of frequency sweeps to determine whether an object is present on or in close proximity to transmitter 100. For convenience, all frequency sweeps are shown overlapping in FIGS. 9-11. However, in practice, there is typically a gap of a few hundred milliseconds between each frequency sweep, as shown in FIG. 8. Further, each ping is repeated after a short waiting period (e.g., typically around 1 second). The y-axis of each plot in FIGS. 9-11 corresponds to the rectified peak voltage, as described above with reference to FIGS. 2A and 2B. For the purposes of ease of discussion below, the peak resonant voltage and peak voltages are assumed to be the rectified peak resonant voltage and the rectified peak voltage. The time between frequency sweeps and the time between pings can vary widely, and may encompass any time (e.g., from a milliseconds to hours to days).

FIG. 9 is an exemplary plot of a plurality of frequency sweeps to determine the open surface resonant frequency of transmitter 100. Plot 900 shows three frequency sweeps of three different power strengths (e.g., at three different input voltages, three different duty cycles, or three different phases) from a high threshold frequency 904 (e.g., 50 kHz, 75 kHz, etc.) to a low threshold frequency 906 (e.g., 300 kHz). Frequency sweep 910 corresponds to a frequency sweep performed by controller 132 at a lowest power strength, frequency sweep 920 corresponds to a frequency sweep performed by controller 132 at a middle power strength, and frequency sweep 930 corresponds to a frequency sweep performed by controller 132 at a highest power strength. The magnitude of the peak voltages of the frequency sweep is directly related to the power strength. As the power strength increases, the magnitude of the peak voltages increases as well. For example, if phase modulation is implemented by controller 132, frequency sweep 910 may have a phase of 5%, frequency sweep 920 may have a phase of 7%, and frequency sweep 930 may have a phase of 9%. In some embodiments, the power strengths (e.g., the phases) chosen for each frequency sweep are chosen such that the peak voltage experiences little to no clipping based on a voltage supply rail of controller 132. For example, if input voltage modulation is implemented by controller 132, frequency sweep 910 may have an input voltage of 12V, frequency sweep 920 may have an input voltage of 13V, and frequency sweep 930 may have an input voltage of 14V.

In some embodiments, the open surface resonant frequency 902 of transmitter 100 is determined (e.g., calibrated) during a first power up of transmitter 100 (e.g., when a user first powers on transmitter 100). In some embodiments, the open resonant frequency of transmitter 100 is determined during a first power up (e.g., during the manufacturing process) and the open resonant frequency 902 is saved into storage (e.g., nonvolatile memory) coupled to or contained within controller 132. Controller 132 may perform one or more pings (e.g., each with one or more frequency sweeps) to detect the open surface resonant frequency 902, as described above in reference to FIGS. 6-8.

In some embodiments, when detecting the open surface resonant frequency 902, controller 132 performs one or more frequency sweeps. Controller 132 may determine that the power strength chosen for each frequency sweep may be configured so that one or more frequency sweeps (e.g., a lower power strength frequency sweep) have a resonant peak voltage lower than a threshold peak voltage 908 and one or more frequency sweeps (e.g., a higher power strength frequency sweep) have a resonant peak voltage higher than threshold peak voltage 908. In some embodiments, the threshold peak voltage is equivalent to a voltage supply rail of controller 132 (e.g., 3.3 V). In some embodiments, the highest power for a frequency sweep in a ping is chosen to be less than an under voltage lockout (UVLO) threshold of a wireless power receiver (e.g., such that a receiver placed on transmitter 100 will not activate a load). For example, frequency sweep 910 (e.g., a low power strength frequency sweep) may have a resonant peak voltage at 912 that has a resonant peak voltage 912 lower than threshold voltage 908 and frequency sweep 920 (e.g., a medium power strength sweep) may also have a resonant peak voltage at 922 that is lower than threshold peak voltage 908. Frequency sweep 930 (e.g., a high power strength frequency sweep) may have a resonant peak voltage at 932, which is higher than threshold voltage 908.

In some embodiments, when detecting the open surface resonant frequency 902, the detected resonant frequency for each frequency sweep (e.g., frequency sweeps 910, 920, and 930) in a ping is significantly the same frequency (e.g., open surface resonant frequency 902), even when the power strength for each frequency sweep is stepped up (e.g., or stepped down) for each subsequent frequency sweep. If the detected resonant frequency for each frequency sweep is significantly the same (e.g., within 1% of each other or less than 200 Hz of each other), as shown in FIG. 9, then controller 132 may store the detected resonant frequency as open surface resonant frequency 902 in a non-volatile memory coupled to controller 132. In some embodiments, controller 132 stores the open surface resonant frequency 902 in one time programmable memory (OTP) in the non-volatile memory.

In some embodiments, when detecting the open surface frequency 902, controller 132 assumes that no foreign objects are present on the surface of transmitter 100. For example, a foreign object may be any object that contains metal, such as a coin, a paper clip, keys, wrench, knife, silverware, tools, safety pin, etc. Controller 132 may determine that a foreign object is present on the surface of transmitter 100 if a peak resonant voltage of a frequency sweep (e.g., frequency sweep 930) that is configured to exceed the threshold voltage 908 does not exceed threshold 908 because a foreign object adds a load (e.g., a resistance) to the transmitter 100 system that lowers the magnitude of the voltage (e.g., below threshold voltage 908).

After controller 132 determines the open surface resonant frequency 902, transmitter 100 beings to scan at regular intervals for the presence of an object, such as a receiver or a foreign object. A receiver may include a coil wrapped around a magnetic material, such as a ferrite core. The receiver is explained in detail in U.S. Patent Publication No. 20170170688, entitled "System For Inductive Wireless Power Transfer For Portable Devices," filed on Dec. 12, 2016, the subject matter of which is hereby incorporated by reference in its entirety. Controller 132 may perform one or more frequency sweeps at regular intervals (e.g., pings at regular intervals) to determine whether one or more receivers or foreign objects have been placed on or in close proximity of the charging surface of transmitter 100. Controller 132 may configure the frequency sweeps to have a similar or slightly higher power strength than the power strengths of the frequency sweeps used to determine open surface resonant frequency 902. In some embodiments, three or more frequency sweeps are performed per ping, and each ping is performed at regular intervals (e.g., every few hundred milliseconds, every 1 second, every 10 seconds, or any other interval of time). In some embodiments, the highest power for a frequency sweep in a ping is chosen to be less than an under voltage lockout (UVLO) threshold of a wireless power receiver (e.g., such that a receiver placed on transmitter 100 will not activate a load). In some embodiments, one or more frequency sweeps are performed per ping.

When controller 132 is scanning (e.g., performing frequency sweeps in pings at regular intervals) transmitter 100, controller 132 may determine that a foreign object or receiver is not on or within a close proximity of the charging surface of transmitter 100 if each detected resonant frequency from the frequency sweeps is substantially the same as the open surface resonant frequency 902. In some instances, controller 132 may detect changes in the resonant frequency and in the magnitude of the resonant peak voltage for each frequency sweep indicative of a foreign object or receiver that is on or within a close proximity of the charging surface of transmitter 100.

In inductive wireless power transfer, the peak resonant frequency of transmitter 100 is not fixed but is rather a function of the nominal inductance and capacitance values of the transmitter coil (e.g., transmitter coil 120 and/or transmitter coil 122) and capacitor (e.g., capacitor 124 and/or capacitor 126) and other factors such as component variations, load, and leakage. Different wireless power receivers may put different loads on a particular wireless power transmitter, and power leakage varies depending on how well-aligned a wireless power receiver's coil is to the transmitter coil. The entire behavior of the wireless power transfer system is affected by variations in the actual resonant frequency of a wireless power transmitter. In general, the open surface resonant frequency 902 has a specific resonant frequency.

FIG. 10 is an exemplary plot of a plurality of frequency sweeps indicative of a metal object present on the surface of transmitter 100. FIG. 10 shows a three frequency sweeps performed from a high threshold frequency 1004 (e.g., 300 kHz) to a low threshold frequency 1006 (e.g., 50 kHz). In some embodiments, the high threshold frequency 1004 and low threshold frequencies 1006 are the same as high threshold frequency 904 and low threshold frequency 906. In some embodiments, voltage peak threshold 1008 is the same value as voltage peak threshold 908 for the open-surface resonant frequency detection described in reference to FIG. 9. The three frequency sweeps are frequency sweep 1010 with a resonant frequency and resonant peak voltage at 1012, frequency sweep 1020 with a resonant frequency and resonant peak voltage at 1022, and frequency sweep 1030 with a resonant frequency and resonant peak voltage at 1032, that include characteristics indicative of a foreign metal object (e.g., a load) being placed on or in close proximity to the charging surface of transmitter 100.

A first characteristic indicative of a foreign metal object being placed on in in close proximity is that the magnitude of the resonant peak voltage at 1032 for frequency sweep 1030, 1022 for frequency sweep 1020, and 1012 for frequency sweep 1010, has decreased with respect to the corresponding magnitudes of the open surface resonant peak voltages (e.g., the magnitude of the resonant peak voltage at 932 for frequency sweep 930, 922 for frequency sweep 920, and 912 for frequency sweep 910, respectively). This decrease in magnitude can be seen in FIGS. 9 and 10. Controller 132 may compare the resonant peak voltages of the frequency sweeps (e.g., when the controller is scanning transmitter 100 at regular intervals) with the corresponding open frequency resonant peak voltages that are stored in non-volatile memory. Controller 132 may determine that the magnitudes of the resonant peak voltages of the frequency sweeps are lower than the open surface resonant peak voltages.

A second characteristic indicative of a foreign metal object being placed on or in close proximity is that the resonant frequency at 1032 for frequency sweep 1030, at 1022 for frequency sweep 1020, and at 1012 for frequency sweep 1010, is the same value and is higher than the open surface resonant frequency 902. The resonant frequency is the same value regardless of the power strength (e.g., as the power strength is stepped up or stepped down for successive sweeps) because the load (e.g., resistance) is the same resistance irrespective of the strength of the frequency sweep. In some embodiments, a resonant frequency that is 1-5% higher than the open surface resonant frequency 902 is indicative of a foreign object containing metal being placed on or within close proximity to the charging surface of transmitter 100. In some embodiments, a resonant frequency that is 1% or higher than the open surface resonant frequency 902 is indicative of a foreign object containing metal being placed on or within close proximity to the charging surface of transmitter 100. For example, if the open surface resonant frequency is 140 kHz, a resonant frequency of 141.4 kHz (e.g., 1% of 140 kHz) or higher is indicative of a foreign object containing metal being placed on or within close proximity to the charging surface of transmitter 100.

Therefore, when controller 132 determines that both (i) the magnitude of the resonant voltage peaks of the one or more frequency sweeps are lower than the corresponding magnitude of the one or more open surface resonant voltage peaks and (ii) the resonant frequencies of the one or more frequency sweeps are substantially the same resonant frequency but higher than the open surface resonant frequency 902, a foreign object containing metal may be on or in a close proximity to the charging surface of transmitter 100.

In some implementations, controller 132 may determine that a foreign object containing metal may be on or in close proximity to the charging surface of transmitter 100 if two or more resonant frequencies from subsequent frequency sweeps (of different power strengths) have a substantially same resonant frequency that is higher than the resonant frequency of the open surface resonant frequency.

In some implementations, as little as one frequency sweep per ping may be used to determine whether there is a foreign object on or in close proximity to the charging surface of transmitter 100. For example, if the frequency sweep has a peak voltage with a lower magnitude than the open surface peak voltage and if the frequency sweep has a resonant frequency higher than the open surface resonant frequency, controller 132 may determine that a foreign object containing a metal is present on or in close proximity to the charging surface of transmitter 100.

In some embodiments, when controller 132 detects that a foreign object may be placed on or in close proximity to the charging surface of transmitter 100, an alert may be sent to the user. For example, in some embodiments, an alarm communicatively coupled to transmitter 100 may alert the user of the presence of a foreign object on or in close proximity to the charging surface of transmitter 100. As another example, the alert may be an alarm, haptic feedback, a notification on a user device (e.g., an alert on the user's mobile phone, tablet, computer, smart watch, etc.). The notification on the user device may be a text-based notification, a verbal/sound notification, a haptic notification (e.g., a vibration of the device), or any combination of the above.

In some embodiments, controller 132 may stop power from being applied to transmitter 100 upon detecting that a foreign object is on or in close proximity to the charging surface of transmitter 100. Transmitter 100 may include a manual override (e.g., such as a button, a switch, an input response on a mobile device or a smart device, etc.) for the user to resume power being applied to transmitter 100 after the user has removed the foreign object from transmitter 100.

FIG. 11 is an exemplary plot of a plurality of frequency sweeps indicative of a receiver present on the surface of transmitter 100. FIG. 11 shows three frequency sweeps performed from a high threshold frequency 1104 (e.g., 300 kHz) to a low threshold frequency 1106 (e.g., 50 kHz). In some embodiments, the high threshold frequency 1004 and low threshold frequencies 1006 are the same as high threshold frequency 904 and low threshold frequency 906. In some embodiments, voltage peak threshold 1108 is the same value as voltage peak threshold 908 for the open-surface resonant frequency detection described in reference to FIG. 9. The three frequency sweeps are frequency sweep 1110 with a resonant frequency and a resonant peak voltage at 1112, frequency sweep 1120 with a resonant frequency and resonant peak voltage at 1122, and frequency sweep 1130 with a resonant frequency and resonant peak voltage at 1132, that include characteristics indicative of a receiver (e.g., that contains a magnetic material) being placed on or in close proximity to the charging surface of transmitter 100.

At low strength frequency sweeps (e.g., chosen to be less than an under voltage lockout (UVLO) threshold of a wireless power receiver), a receiver placed on or in close proximity (e.g., close enough to change the effective inductance of transmitter 100) to the charging surface of transmitter 100 will not activate a load. Instead, because the receiver contains a magnetic material such as a ferrite with a winding wrapped around the magnetic material, the presence of the magnetic material (e.g., ferrite) on the surface of or in close proximity to transmitter 100 will add to the self-inductance of transmitter 100, increasing the overall effective inductance of transmitter 100. The effective inductance of transmitter 100 is a combination of the self-inductance of transmitter 100 and mutual inductance between transmitter 100 and a receiver. As the overall effective inductance of transmitter 100 increases, the resonant frequency of transmitter 100 will decrease in relation to open surface resonant frequency 902. In some embodiments, the ferrite receiver being in close proximity to transmitter 100 lowers the resonant frequency of transmitter 100 to 1% to 5% lower than the open surface resonant frequency 902. In some embodiments, the receiver must have a magnetic component (e.g., a ferrite core) to lower the resonant frequency of transmitter 100 to 1% to 5% lower than the open surface resonant frequency 902. In some embodiments, an air-cored coil (e.g., that does not contain a magnetic material, such as a ferrite) will not cause any change in the open surface resonant frequency 902.

In some embodiments, a receiver includes a bridge rectifier (e.g., either a full-bridge rectifier circuit or a half-bridge rectifier circuit) and a capacitor. The capacitor adds to the capacitance of the transmitter 100 when the receiver is placed on or within close proximity of the charging surface of transmitter 100. The added capacitance causes a downward shift in the resonant frequency at the lowest strength frequency sweep (e.g., when implementing phase modulation, at the 5% phase frequency sweep when having three frequency sweeps at 5%, 7%, and 9% phases). However, as the power strength of each subsequent frequency sweep increases, (e.g., from 5% to 7% phase, and from 7% to 9% phase), the resonant frequency increases with each increasing power strength frequency sweep. The presence of a magnetic material (e.g., a ferrite) in a receiver which is not drawing significant load current yet on account of the low strength the first frequency sweep, will serve to simply increase effective inductance of the resonant circuit of the combined system (e.g., the transmitter 100 and receiver system), and so the resonant frequency of the first (lowest strength) ping will be lower than the open frequency resonant frequency 902. Then, the subsequent frequency sweeps with increasing power strengths will typically have slightly increasing resonant frequencies as the receiver circuit starts drawing load current. When a receiver is present, the resonant frequencies increase when power strengths of the subsequent frequency sweeps increase because the receiver draws an increasing amount of load current, and thus becomes an increasingly resistive load. Increasing resistive behavior always causes an upward shift in the resonant frequency of any resonant circuit. The amount the resonant frequencies increase as the receiver circuit gets activated and starts drawing load current is dependent on the actual input V-I (voltage versus current) characteristics of the receiver circuit, so it is possible that resonant frequencies of a three frequency sweep ping increase as the power strength of each subsequent frequency sweep increases, but that the increasing resonant frequencies are still lower than the open surface resonant frequency.

The controller 132 may configure the strength of the first frequency sweep to be low but not noise-prone, (e.g., such that the lowest strength frequency sweep is less than the open surface resonant frequency 902) and may configure the step size (e.g., the uniform change in power strength between each subsequent frequency sweep) such that subsequent frequency sweeps have resonant frequencies that are higher than the resonant frequency of the first, lowest power strength frequency sweep. Therefore, a receiver is distinguishable from a foreign object containing metal because, as described above with reference to FIG. 10, the resonant frequency is (i) constant for subsequence frequency sweeps and (ii) always higher than the open surface resonant frequency 902 when a foreign object containing metal is present on or in close proximity to a charging surface of transmitter 100.

Therefore, when controller 132 determines that either, or both, (i) the resonant frequency of the lowest power frequency sweep (e.g., frequency sweep 1110 at 1112) in the ping is lower than the open surface resonant frequency 902 and/or (ii) the resonant frequency of the highest power frequency sweep (e.g., frequency sweep 1130 at 1132) in the ping is not equal to the resonant frequency of the lowest power frequency sweep (e.g., frequency sweep 1110 at 1112) within an error threshold, then controller 132 determines that a receiver containing a magnetic material may be on or in a close proximity of the surface of transmitter 100. In some implementations, the error threshold may be 0-1% of the resonant frequency of the lowest power frequency sweep. In some implementations, the error threshold may be 0-1% of the resonant frequency of the highest power frequency sweep.

In some embodiments, as little as one frequency sweep per ping may be used to determine whether there is a receiver on or in close proximity to the charging surface of transmitter 100. For example, if a frequency sweep has a resonant frequency that is lower than the open surface resonant frequency (within a 0-1% error threshold), then controller 132 may determine that a receiver is present on or in close proximity to the charging surface of transmitter 100.

In some embodiments, two or more frequency sweeps per ping may be used to determine whether there is a receiver on or in close proximity to the charging surface of transmitter 100. For example, if a higher power frequency sweep has a resonant frequency higher than a lower power resonant frequency, then controller 132 may determine that a receiver is present on or in close proximity to the charging surface of transmitter 100. As another example, if a higher power frequency sweep has a resonant frequency higher than a lower power resonant frequency, and the lower power resonant frequency is lower than the open surface resonant frequency, then controller 132 may determine that a receiver is present on or in close proximity to the charging surface of transmitter 100.

After a receiver is determined to be on or in close proximity to the charging surface of transmitter 100 and a metal foreign object has not been detected on or in close proximity to the charging surface of transmitter 100, then controller 132 may power on the receiver. Powering on and operating the receiver, using an operating frequency slightly higher than the detected resonant frequency of the transmitter 100, is explained in detail in U.S. patent application Ser. No. 16/287,660, entitled "Systems and Methods for High-Power Wireless Power Transfer with Dual-Qi Compatibility," filed on Feb. 27, 2019, the subject matter of which is hereby incorporated by reference in its entirety.

After a receiver is operational, and wireless power is being transferred from transmitter 100 to the receiver, controller 132 may detect that a foreign metal object is placed on or in close proximity to the charging surface of transmitter 100. In order to detect the presence of the foreign metal object, controller 132 may constantly monitor for a threshold drop in the peak resonant voltage in a threshold amount of time. In some embodiments, the threshold drop in the peak resonant voltage is between 0.4 and 1 V. In some embodiments, the threshold drop in peak resonant voltage is a voltage greater than 0.4 V. In some embodiments, the threshold amount of time is between 2 ms and 15 ms. In some embodiments, the threshold drop in peak voltage and the threshold time can be any values determined based on test or simulation data and stored in non-volatile memory. For example, controller 132 may monitor for a threshold drop in the resonant peak voltage of 0.4 V or larger with a 15 ms period of time. In response to detecting a threshold drop in the resonant peak voltage within the threshold time, controller 132 determines that a metal foreign object has been placed on or in close proximity to the charging surface of transmitter 100 or a catastrophic failure has occurred within the receiver or transmitter 100. Upon detecting the threshold drop in the resonant peak voltage within the threshold time, controller 132 may shut down transmitter 100 and alert the user, as described above.

FIG. 11 is a flow chart of a process for detecting an object on or in close proximity to a charging surface of a wireless power transmitter, according to some implementations. Process 1200 begins at 1202, where controller 132 detects the open surface resonant frequency of transmitter 100. Controller 132 detects the open surface resonant frequency of transmitter 100 by performing frequency sweeps, as described in detail above. At 1204, controller 132 performs one or more frequency sweeps of transmitter 100. For example, controller 132 may perform one or more frequency sweeps using phase modulation, as described in detail above. As another example, controller 132 may perform one or more frequency sweeps using duty cycle modulation or input voltage modulation, a described in detail above. At 1206, controller 132 determines, from the one or more frequency sweeps, that an object has been placed on or in close proximity to the charging surface transmitter 100. Controller 132 may determine whether an object has been placed on or in close proximity to the charging surface of transmitter 100 based on characteristics of the resonant frequency and magnitude of the resonant peak voltage, as described above in reference to FIGS. 9-11. For example, controller 132 may determine from a comparison of the one or more resonant frequencies of the frequency sweeps with the open surface resonant frequency whether a receiver or a foreign object is placed on or in close proximity to the charging surface of transmitter 100.

The above described foreign object detection systems and methods increase the reliability, efficiency, and safety of wireless power transfer systems. The above methods and systems rely on actual real-time measured resonant frequency values of the transmitter 100 where previous systems relied on estimations of power input and output. Furthermore, the methods and systems described above allow for more precise detection and identification of the type of object on or in close proximity to the charging surface of the wireless power transmitter based detecting changes in the resonant frequency over time and determining whether an object is present based on the characteristics of the changes in the resonant frequency. Furthermore, they reduce the fire hazard risk that plague the Qi foreign object detection technique, and do not relay on the decay of power values over time.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for detecting a foreign object on a wireless power transmitter, the wireless power transmitter configured to wirelessly charge power to a device when the device is on or in close proximity to a charging surface of the wireless power transmitter, the method comprising:
    detecting a first resonant frequency of the wireless power transmitter when the foreign object is not present on or is not in close proximity to the charging surface of the wireless power transmitter;
    detecting a second resonant frequency of the wireless power transmitter in response to applying a first power to the wireless power transmitter;
    detecting a third resonant frequency of the wireless power transmitter in response to applying a second power to the wireless power transmitter;
    comparing the first, second, and third resonant frequencies; and
    based on the comparison, determining whether the foreign object is present on or in close proximity to the surface of the wireless power transmitter.

2. The method of claim 1, further comprising:
    determining whether the first, second, and third resonant frequencies are substantially a same value;
    in response to determining that the first, second, and third resonant frequencies are not the substantially same value, determining that the foreign object is present on or in close proximity to the charging surface of the wireless power transmitter; and
    in response to determining that the first, second, and third resonant frequencies are the substantially same value, determining that the foreign object is not present on or in close proximity to the charging surface of the wireless power transmitter.

3. The method of claim 1, further comprising:
    determining that the foreign object is not on or is not in close proximity to the charging surface of the wireless power transmitter if the second resonant frequency is substantially the same as the first resonant frequency.

4. The method of claim 1, further comprising:
    determining that the foreign object is on or is in close proximity to the charging surface of the wireless power transmitter if the second resonant frequency is lower than the first resonant frequency.

5. The method of claim 4, wherein the foreign object comprises a magnetic material.

6. The method of claim 1, further comprising:
    determining that the foreign object is on or is in close proximity to the charging surface of the wireless power transmitter if the second resonant frequency is higher than the first resonant frequency.

7. The method of claim 6, wherein the foreign object comprises a metal.

8. The method of claim 7, further comprising:
    outputting an indicating signal that the foreign object is on or is in close proximity to the charging surface of the wireless power transmitter.

9. A system for detecting a foreign object on a wireless power transmitter, the wireless power transmitter configured to wirelessly charge power to a device when the device is on or in close proximity to a charging surface of the wireless power transmitter, the system comprising:
    the wireless power transmitter;
    a controller coupled to the wireless power transmitter configured to:
        detect a first resonant frequency of the wireless power transmitter when the foreign object is not present on or is not in close proximity to the charging surface of the wireless power transmitter;
        detect a second resonant frequency of the wireless power transmitter in response to applying a first power to the wireless power transmitter;
        detect a third resonant frequency of the wireless power transmitter in response to applying a second power to the wireless power transmitter;
        compare the first, second, and third resonant frequencies; and
        based on the comparison, determine whether the foreign object is present on or in close proximity to the charging surface of the wireless power transmitter.

10. The system of claim 9, wherein the controller is further configured to:
    determine whether the first, second, and third resonant frequencies are a substantially same value;
    in response to determining that the first, second, and third resonant frequencies are not the substantially same value, determine that the foreign object is present on or in close proximity to the charging surface of the wireless power transmitter; and
    in response to determining that the first, second, and third resonant frequencies are the substantially same value, determine that the foreign object is not present on or in close proximity to the charging surface of the wireless power transmitter.

11. The system of claim 9, wherein the controller is further configured to:
    determine that the foreign object is not on or is not in close proximity to the charging surface of the wireless power transmitter if the second resonant frequency is substantially the same as the first resonant frequency.

12. The system of claim 9, wherein the controller is further configured to:
    determining that the foreign object is on or is in close proximity to the charging surface of the wireless power transmitter if the second resonant frequency is lower than the first resonant frequency.

13. The system of claim 12, wherein the foreign object comprises a magnetic material.

14. The system of claim 9, wherein the controller is further configured to:
    determine that the foreign object is on or is in close proximity to the charging surface of the wireless power transmitter if the second resonant frequency is higher than the first resonant frequency.

15. The system of claim 14, wherein the foreign object comprises a metal.

16. The system of claim 15, wherein the controller is further configured to:
    output an indicating signal that the foreign object is on or is in close proximity to the charging surface of the wireless power transmitter.

* * * * *